United States Patent
Takama

(10) Patent No.: US 12,406,385 B2
(45) Date of Patent: Sep. 2, 2025

(54) SHAPE ESTIMATION APPARATUS, PROCESSING METHOD, AND COMPUTER-READABLE STORAGE MEDIUM

(71) Applicant: CANON KABUSHIKI KAISHA, Tokyo (JP)

(72) Inventor: Yasufumi Takama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 408 days.

(21) Appl. No.: 18/178,594

(22) Filed: Mar. 6, 2023

(65) Prior Publication Data

US 2023/0289987 A1 Sep. 14, 2023

(30) Foreign Application Priority Data

Mar. 14, 2022 (JP) .................................. 2022-039560

(51) Int. Cl.
G06T 7/55 (2017.01)

(52) U.S. Cl.
CPC ...... *G06T 7/55* (2017.01); *G06T 2207/10024* (2013.01)

(58) Field of Classification Search
CPC . G06T 7/55; G06T 2207/10024; G06T 7/194; G06T 2207/10028; G06T 7/564; G06T 17/00; G06T 7/50

(Continued)

(56) References Cited

U.S. PATENT DOCUMENTS

| | | | |
|---|---|---|---|
| 11,055,902 B2 | 7/2021 | Lucas | |
| 11,189,041 B2 | 11/2021 | Takama | |

(Continued)

FOREIGN PATENT DOCUMENTS

| | | |
|---|---|---|
| JP | 2012-208759 A | 10/2012 |
| JP | 2021-072604 A | 5/2021 |

OTHER PUBLICATIONS

Seitz, S.M. et al., "A Comparsion and Evaluation of Multi-View Stereo Reconstruction Algorithms" Conference on Computer Vision and Pattern Recognition, 2006 IEEE Computer Society (Jun. 2006) pp. 519-528, vol. 1.

(Continued)

*Primary Examiner* — Matthew C Bella
*Assistant Examiner* — Daniel Joseph Santos
(74) *Attorney, Agent, or Firm* — Carter, DeLuca & Farrell LLP

(57) ABSTRACT

A shape estimation apparatus estimates, based on captured images obtained by capturing an object from different directions using a plurality of image capturing apparatuses, a first element group representing a three-dimensional shape of the object, determines whether to delete elements from the first element group, and generates a second element group by deleting the elements from the first element group. With respect to a first element among elements forming a surface of the shape represented by the first element group, if a distance between the first element and a second element corresponding to a position at which a straight line connecting the first element and the image capturing apparatus that has captured the first element intersects the surface does not exceed a predetermined threshold, the first element is excluded from a deletion target.

12 Claims, 8 Drawing Sheets

(58) Field of Classification Search
USPC .......................................................... 382/154
See application file for complete search history.

(56) References Cited

U.S. PATENT DOCUMENTS

| | | |
|---|---|---|
| 2013/0222368 A1 | 8/2013 | Takama et al. |
| 2018/0096463 A1* | 4/2018 | Kim et al. .............. G06T 5/002 |
| 2022/0044477 A1 | 2/2022 | Takama et al. |
| 2023/0098633 A1 | 3/2023 | Takama |

OTHER PUBLICATIONS

Extended European Search Report issued in EP Patent Application No. 23160734.2, dated Jun. 6, 2023, pp. 1-9.

* cited by examiner

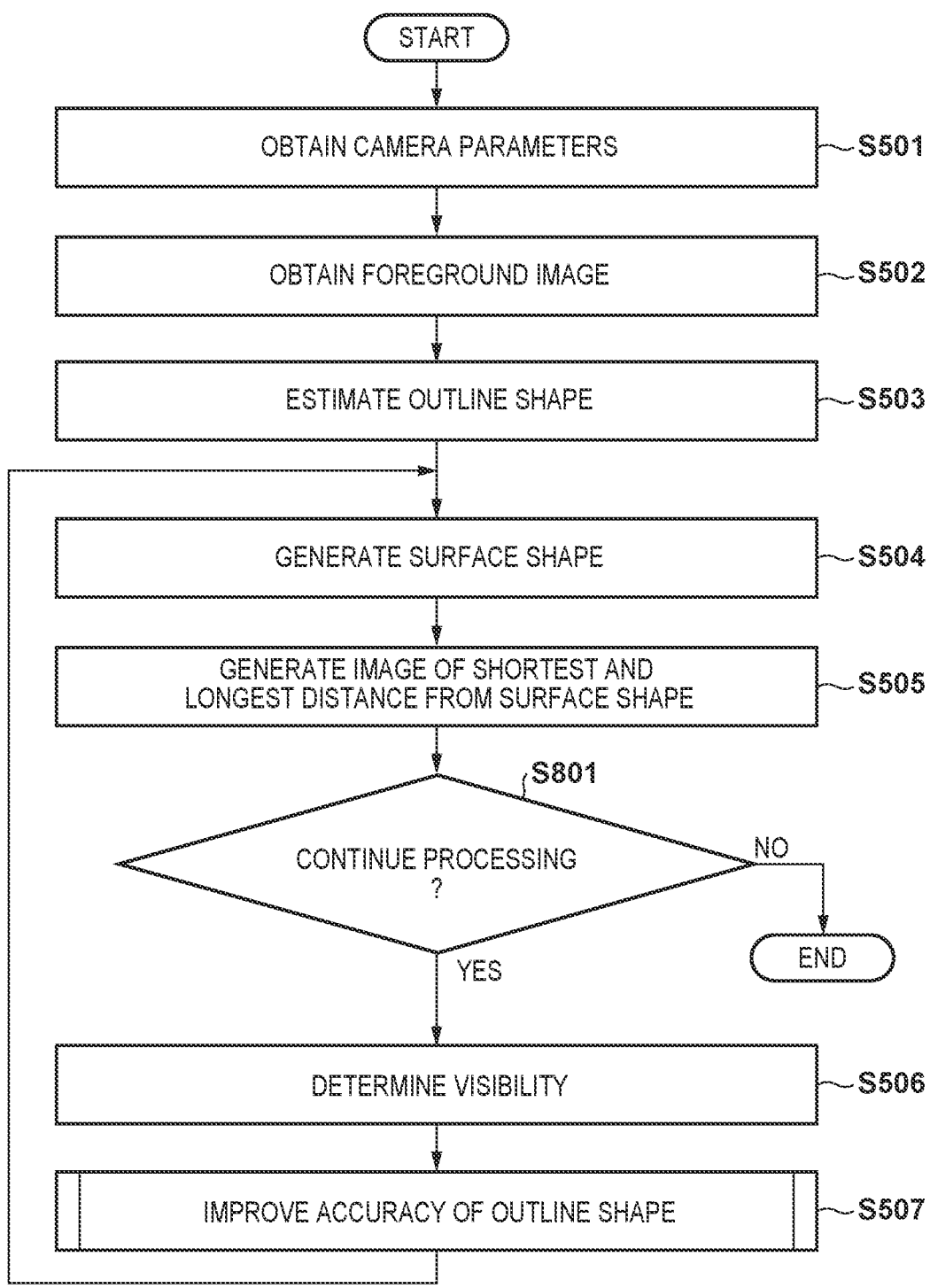

SHAPE ESTIMATION APPARATUS, PROCESSING METHOD, AND COMPUTER-READABLE STORAGE MEDIUM

BACKGROUND

Field of the Disclosure

The present disclosure relates to a technique of generating a three-dimensional shape model of an object using images obtained by capturing the object from a plurality of directions.

Description of the Related Art

There is known a technique of reproducing an object in a virtual space using captured images obtained by capturing the object from different directions using a plurality of cameras, and outputting an image observed at an arbitrary magnification in an arbitrary direction from an arbitrary viewpoint in the virtual space. A viewpoint, a line-of-sight direction, and the like in the virtual space will be referred to as a virtual viewpoint hereinafter, and an image observed at a virtual viewpoint will be referred to as a virtual viewpoint image hereinafter.

To generate a high-quality virtual viewpoint image, it is important to accurately generate a shape model representing a three-dimensional shape of an object. The shape model is represented by, for example, a mesh indicating a three-dimensional shape of the object by a polyhedron or a point group indicating the shape of the object by a number of vertices. Note that if a mesh is used, the shape model includes triangles or rectangles as elements. If a point group is used, the shape model includes points as elements. Japanese Patent Laid-Open No. 2012-208759 describes a technique in which whether to delete an element included in a shape model is determined based on the variance values of color corresponding to the element using a plurality of images captured by a plurality of cameras each of which can capture the element without any obstacle, and the accuracy of the shape model is thus improved.

In the method of improving the accuracy of the shape model described in Japanese Patent Laid-Open No. 2012-208759, it may be impossible to correctly select, depending on the shape of the object, a camera that can capture an element of the shape model without any obstacle, and it may thus be impossible to sufficiently improve the accuracy of the shape model.

SUMMARY OF THE DISCLOSURE

The present disclosure provides a technique of accurately generating a shape model while reducing the influence of the shape of an object.

According to one aspect of the present disclosure, there is provided shape estimation apparatus, comprising: one or more processors; and one or more memories that store computer-readable instructions for causing, when executed by the one or more processors, the one or more processors to function as: an estimation unit configured to estimate, based on captured images obtained by capturing an object from different directions using a plurality of image capturing apparatuses, a first element group representing a three-dimensional shape of the object; a determination unit configured to determine, for each of elements included in the first element group, based on color in the captured images corresponding to the element, whether to delete the element from the first element group; and a generation unit configured to generate a second element group by deleting, from the first element group, the element determined to be deleted, wherein with respect to a first element among elements forming a surface of the shape represented by the first element group, in a case where a distance between the first element and a second element different from the first element and corresponding to a position at which a straight line connecting the first element and the image capturing apparatus that has captured the first element intersects the surface does not exceed a predetermined threshold, the determination unit determines to exclude the first element from a deletion target from the first element group regardless of the color.

Further features of the present disclosure will become apparent from the following description of exemplary embodiments with reference to the attached drawings.

BRIEF DESCRIPTION OF THE DRAWINGS

FIG. 8 is a flowchart illustrating an example of the procedure of shape estimation processing according to the second embodiment.

DESCRIPTION OF THE EMBODIMENTS

Figure 1:
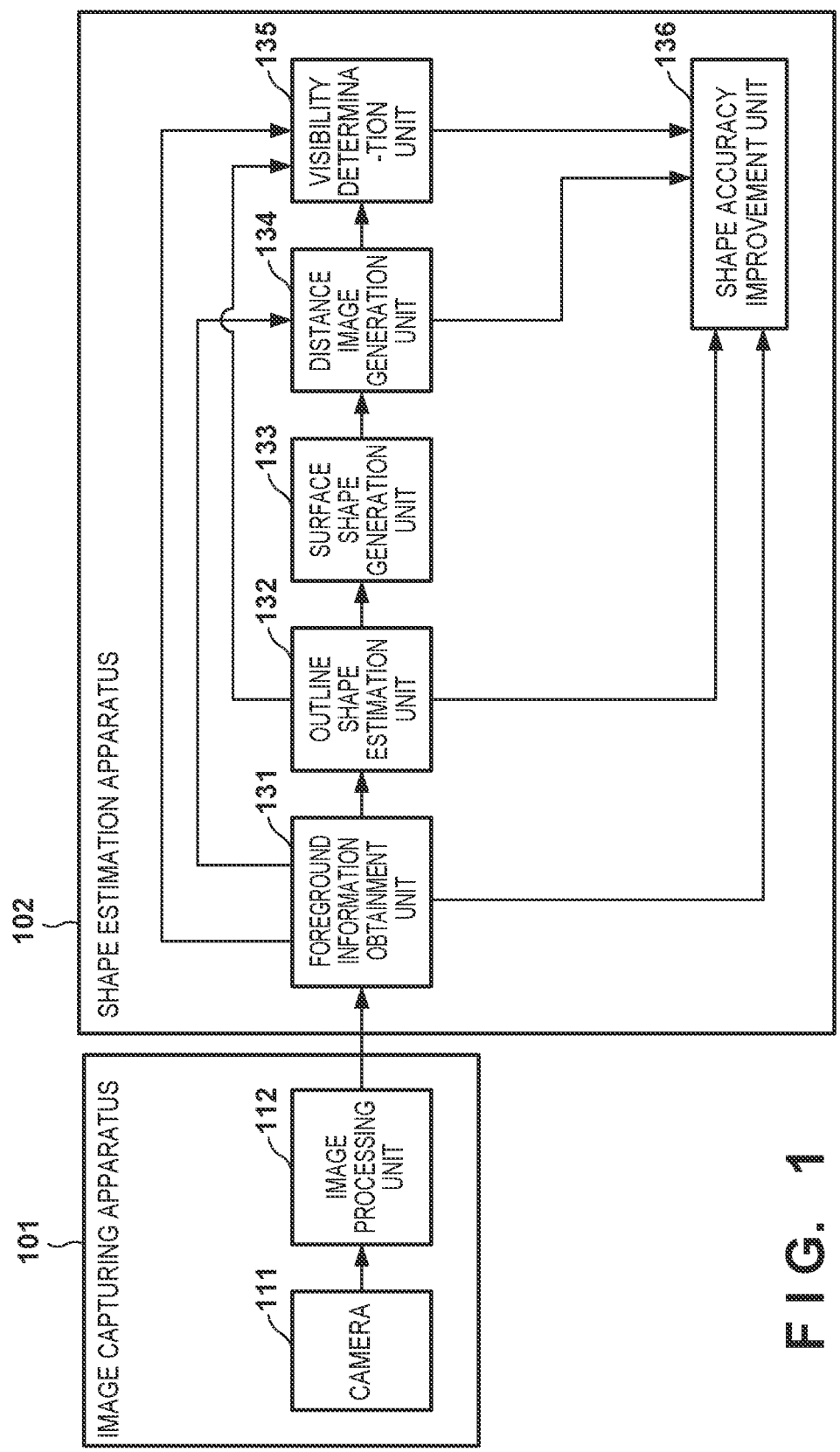
FIG. 1 is a block diagram showing an example of a system configuration according to the first embodiment.

Hereinafter, embodiments will be described in detail with reference to the attached drawings. Note, the following embodiments are not intended to limit the scope of the disclosure. Multiple features are described in the embodiments, but limitation is not made to disclosure that requires all such features, and multiple such features may be combined as appropriate. Furthermore, in the attached drawings, the same reference numerals are given to the same or similar configurations, and redundant description thereof is omitted.

First Embodiment

In this embodiment, a first model representing a three-dimensional shape of an object is generated based on captured images, and the accuracy of the first model is improved. In this accuracy improvement processing, for example, if the outline shape of the object is represented by a point group, processing of deleting, from the point group, points not to be used as the three-dimensional shape model of the object is performed. This deletion determination processing, for example, is performed for each point included in the point group based on whether color variance observed by a plurality of cameras (cameras that can view the point) is large, that is, color viewed by a number of cameras varies. Then, if variance is large and color viewed by a number of cameras varies, it can be determined that the point is a point to be deleted. With this processing, for example, a point in a region, such as a concave portion of the object, where color is viewed differently depending on an observation angle can be deleted, thereby more accurately forming a three-dimensional shape model of the object. On the other hand, a case can be assumed in which points referred to as the same point of the object in the accuracy improvement processing actually correspond to, for example, two different points of a long and narrow shape or a thin shape included in the object. In this case, for example, if the front and rear surfaces of the thin shape are largely different in color, it is determined that color variance is large, and the points may unwantedly be deleted. That is, if the distance between two points is small, the two points may be referred to as the same point, and then if color variance is large, the points that actually should not be deleted may be deleted erroneously. This embodiment provides a technique of preventing such points from being deleted erroneously based on a distance image of the object when viewed from each camera.

(System Configuration)

FIG. 1 shows an example of the configuration of a system for generating a virtual viewpoint image according to this embodiment. This system includes, for example, an image capturing apparatus 101 and a shape estimation apparatus 102.

As shown in FIG. 1, the image capturing apparatus 101 includes, as its functions, for example, a camera 111 and an image processing unit 112. Note that these components are merely examples, and an arrangement different from that shown in FIG. 1 may be used. For example, if a virtual viewpoint image is generated based on an image read by a scanner and the like, the system need not include the image capturing apparatus 101. For example, the function of the image processing unit 112 may be included in the shape estimation apparatus 102. That is, in the following description, the image capturing apparatus 101 and the camera 111 indicate different constituent elements, respectively. However, the image capturing apparatus 101 and the camera 111 may indicate the same constituent element.

Referring to FIG. 1, this system includes only one image capturing apparatus 101 for the sake of descriptive convenience but the system is configured so that a plurality of image capturing apparatuses 101 are prepared and cameras 111 of the plurality of image capturing apparatuses 101 capture the object from different directions, respectively. For example, the plurality of cameras 111 are installed at different positions to surround the object such that the facing directions are different (for example, the cameras respectively face the direction of the object). If, for example, image capturing is performed in a stadium such as a soccer or rugby stadium, several ten to several hundred image capturing apparatuses 101 can be installed on the circumference of the stadium. Note that the cameras 111 need not be able to capture the object from all directions surrounding the object. If, for example, the installation places are limited, the cameras 111 may be arranged to capture the object from only some directions. Note that in one example, the image capturing apparatus 101 in which one image processing unit 112 is prepared for one camera 111 may be used, or one image processing unit 112 may be prepared for a number of cameras 111. That is, in one example, one or a few image capturing apparatuses 101 each including the image processing unit 112 may exist, and the one or few image capturing apparatuses 101 may control a number of cameras 111, thereby performing image capturing. As at least some of the plurality of cameras 111, cameras having different angles of view, such as a telephotographic camera and a wide-angle camera, may be used. The plurality of cameras 111 are configured to be synchronized with one piece of time information in the real world when, for example, the image capturing apparatus 101 obtains time information by accessing a time server. Assume that an image of each frame in videos captured by the plurality of cameras 111 is then assigned with image capturing time information. Assume that identification information for identifying each of the plurality of cameras 111 is assigned to each of the plurality of cameras 111.

The image processing unit 112 executes predetermined image processing for the captured image obtained by image capturing by the camera 111. Note that the image processing unit 112 can be implemented when, for example, a general-purpose computer (processor) executes a program but may be implemented by, for example, a dedicated hardware component. Note that the image capturing apparatus 101 may have the same hardware arrangement as that of the shape estimation apparatus 102 (to be described later), and the function of the image processing unit 112 may be implemented using the hardware arrangement. The image processing unit 112 executes, as the predetermined image processing, for example, processing of generating a foreground image by extracting a foreground portion from the captured image. The foreground image is an image generated by extracting a region (to be referred to as a "foreground region" hereinafter), including the object, of the captured image. If, for example, image capturing is continuously performed at the same angle of view for a predetermined period, the object extracted as the foreground region indicates a dynamic object (moving body) which is moving (whose position and shape can change). The dynamic object includes, for example, a person such as a player or a referee in a field where a sporting event takes place, and a ball in a case of a ball game. Furthermore, the dynamic object can include, for example, a singer, a player, a performer, and a host in a concert or an entertainment. The image processing unit 112 supplies the result (for example, the foreground image) of the image processing to the shape estimation apparatus 102.

Note that the image processing unit 112 may have a function of detecting an abnormality of the camera. Abnormality information indicating the presence/absence of an abnormality is sent to the shape estimation apparatus 102. An abnormality of the camera can be detected by, for example, evaluating the value of a general sensor such as heat or vibration.

The image processing unit 112 can hold, for example, the state information of the camera 111 including one or more of the position, posture (direction and image capturing direction), focal length, optical center, distortion, F-number, and the like of the camera. A state of the camera 111 will be referred to as a "camera parameter" hereinafter. The camera parameter can be controlled by the image processing unit 112. Note that the present disclosure is not limited to this, and for example, a constituent element other than the image processing unit 112 may control at least one of the camera parameters. For example, a platform to which the camera 111 is attached may control the position and posture of the camera 111. That is, the camera parameters may include a parameter controlled by another device such as a platform. Note that the camera parameters concerning the position and posture of the camera 111 vary due to a factor outside the camera 111, and will thus be referred to as "extrinsic parameters" hereinafter. On the other hand, parameters concerning the focus length, image center, and distortion of the camera 111 are setting parameter in the camera 111, and will thus be referred to as "intrinsic parameters" hereinafter.

Figure 2A:
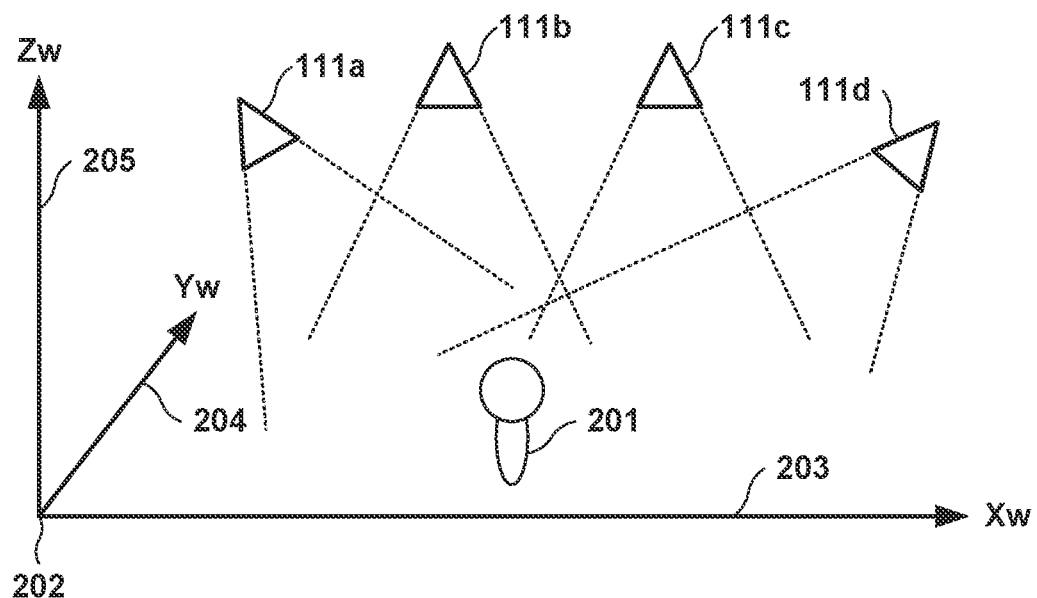
FIGS. 2A and 2B are views for respectively explaining the coordinate systems of camera parameters.
Figure 2B:
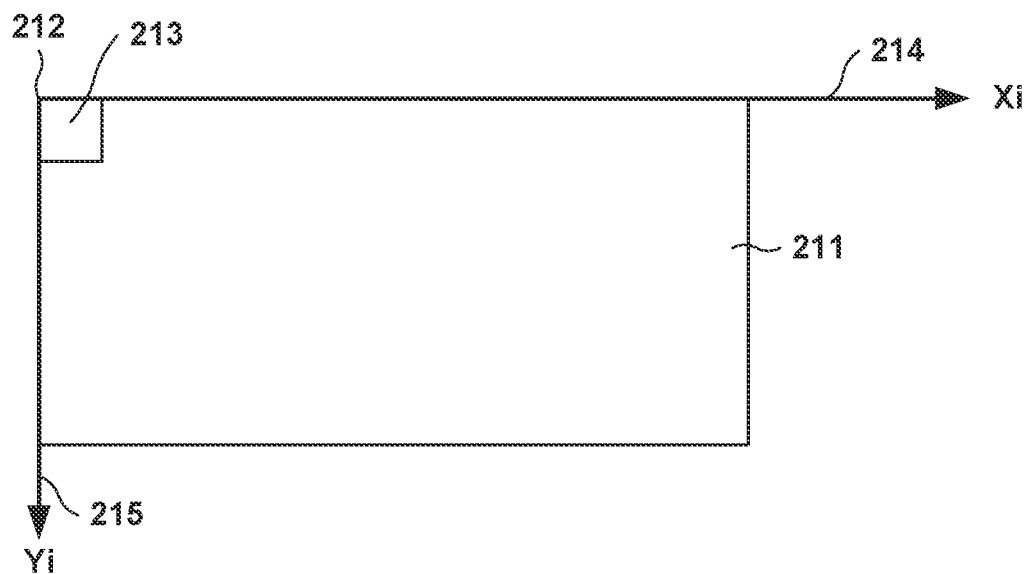

A coordinate system concerning the cameras 111 will now be described with reference to FIGS. 2A and 2B. FIG. 2A shows a state in which cameras 111a to 111d each for capturing an object 201 are arranged in a three-dimensional space. The position and posture of each of the cameras 111a to 111d are represented by one world coordinate system represented by a three-dimensional coordinate origin 202, an Xw-axis 203, a Yw-axis 204, and a Zw-axis 205. That is, a position at which each of the cameras 111a to 111d is arranged is represented by three-dimensional coordinates, and a direction in which each of the cameras 111a to 111d faces is indicated by a three-dimensional vector. FIG. 2B shows a camera image coordinate system (to be referred to as an image coordinate system hereinafter) in a captured image 211 of the camera 111a. As shown in FIG. 2B, in the image coordinate system, a two-dimensional coordinate origin 212, an Xi-axis 214, and a Yi-axis 215 are set, and a pixel at a coordinate (0, 0) is indicated by a pixel 213. Note that the image coordinate system of each of the remaining cameras 111b to 111d is similarly defined.

Note that as described above, for example, the function of the image processing unit 112 may be included in the shape estimation apparatus 102. In this case, an image captured by the camera 111 is input to the shape estimation apparatus 102, and the above-described processing executed by the image processing unit 112 is executed by the shape estimation apparatus 102.

Figure 3:
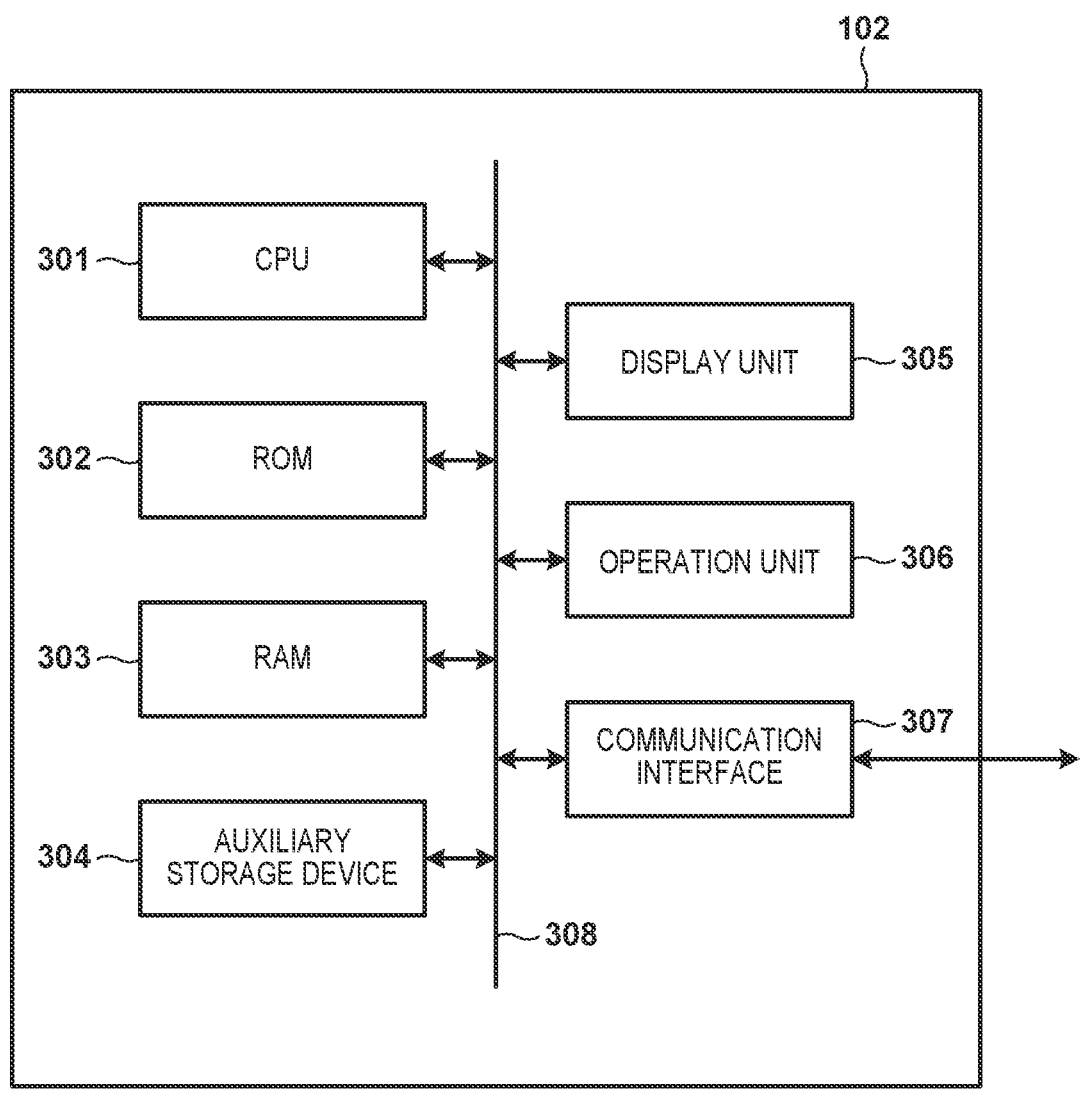
FIG. 3 is a block diagram showing an example of the hardware arrangement of a shape estimation apparatus.

Subsequently, the shape estimation apparatus 102 will be described. The shape estimation apparatus 102 can be implemented by, for example, a general-purpose computer. The shape estimation apparatus 102 includes, for example, as the hardware arrangement, a CPU 301, a ROM 302, a RAM 303, an auxiliary storage device 304, a display unit 305, an operation unit 306, and a communication interface 307, as shown in FIG. 3. Note that these hardware components are interconnected via, for example, a bus 308. Note that CPU is an abbreviation for Central Processing Unit, ROM is an abbreviation for Read Only Memory, and RAM is an abbreviation for Random Access Memory.

The CPU 301 controls the overall shape estimation apparatus 102 using computer programs and data stored in the ROM 302 and the RAM 303, thereby implementing the respective functions (to be described below) of the shape estimation apparatus 102 shown in FIG. 1. Note that the shape estimation apparatus 102 may include one or more dedicated hardware components different from the CPU 301, and at least some of the functions to be described below may be implemented by the dedicated hardware components. The dedicated hardware components can include, for example, an ASIC (Application-Specific Integrated Circuit), an FPGA (Field Programmable Gate Array), and a DSP (Digital Signal Processor). The ROM 302 stores, for example, programs and data that need not be changed. The RAM 303 temporarily stores, for example, a program and data supplied from the auxiliary storage device 304 and data externally supplied via the communication interface 307. The auxiliary storage device 304 is formed by, for example, a hard disk drive, and stores various data such as image data and audio data.

The display unit 305 is formed by, for example, a liquid crystal display, an LED, or the like, and displays a GUI (Graphical User Interface) or the like used by the user to operate the shape estimation apparatus 102. The operation unit 306 is formed by, for example, a keyboard, a mouse, a joystick, a touch panel, or the like, and generates, upon accepting a user operation, various kinds of instruction signals corresponding to the user operation and provides them to the CPU 301. Note that the CPU 301 operates as a display control unit configured to control the display unit 305 and an operation control unit configured to control the operation unit 306. The communication interface 307 is an interface used for communication with an apparatus outside the shape estimation apparatus 102. For example, if the shape estimation apparatus 102 is connected to an external apparatus via a wire, a communication cable is connected to the communication interface 307. If the shape estimation apparatus 102 has a function of wirelessly communicating with an external apparatus, the communication interface 307 includes an antenna.

Note that the shape estimation apparatus 102 may obtain, via the communication interface 307, for example, information indicating a user operation or the like from an external user client apparatus (not shown), and execute processing in accordance with the information. In this case, the operation unit 306 may be omitted. Similarly, the shape estimation apparatus 102 may cause the external apparatus to display various kinds of information. In this case, the display unit 305 in the shape estimation apparatus 102 may be omitted. Furthermore, the shape estimation apparatus 102 may be configured not to display information or not to accept a user operation. In this case as well, the display unit 305 or the operation unit 306 may be omitted. The image capturing apparatus 101 may also have at least part of the arrangement shown in FIG. 3. For example, in the image capturing apparatus 101, the image processing unit 112 may be implemented using the CPU 301, the ROM 302, the RAM 303, and the like. The image processing unit 112 may be implemented by a dedicated hardware component such as an ASIC.

Referring back to FIG. 1, the functions of the shape estimation apparatus 102 will be described. Assume that these functions are implemented when, for example, the CPU 301 executes the computer programs stored in the ROM 302 and the RAM 303, as described above. As shown in FIG. 1, the shape estimation apparatus 102 includes, as its functions, for example, a foreground information obtainment unit 131, an outline shape estimation unit 132, a surface shape generation unit 133, a distance image generation unit 134, a visibility determination unit 135, and a shape accuracy improvement unit 136. Note that these components are merely examples, and components different from those shown in FIG. 1 may be used as long as processing functions (to be described later) can be implemented. In one example, as described above, the image processing unit 112 may be included in the shape estimation apparatus 102.

The foreground information obtainment unit 131 obtains, from the image processing unit 112, a foreground image in an image captured by the camera 111 and the camera parameters of the camera 111. The foreground information obtainment unit 131 can be implemented as, for example, a function of obtaining the foreground image and the camera parameters transmitted from the image capturing apparatus 101 via the communication interface 307. For example, the obtained information can be stored in the RAM 303 or the auxiliary storage device 304 under the control of the CPU 301. Note that the camera parameters may be obtained synchronously with obtainment of the captured image, may be obtained in a preparation stage, or may be obtained asynchronously with obtainment of the captured image, as needed. The foreground information obtainment unit 131 can obtain abnormality information of the camera from the image capturing apparatus 101. Note that this is merely an example, and the foreground information obtainment unit 131 may decide the camera parameters to be used. For example, the foreground information obtainment unit 131 extracts a feature point in an image obtained when the camera 111 captures in advance a marker (for example, a checkerboard) for camera calibration. Then, the foreground information obtainment unit 131 associates a position, at which the marker is actually arranged, with a position at which the marker is included in the image. While projecting the corresponding point in the image onto each camera, and performing optimization to minimize an error between the position of the projected corresponding point and the position at which the corresponding point should actually exist, the foreground information obtainment unit 131 can decide the camera parameters by calibrating each camera. The calibration operation can be performed by an arbitrary existing method. If the foreground information obtainment unit 131 decides the camera parameters, for example, the shape estimation apparatus 102 may be directly connected to the camera 111 via the communication interface 307. Then, the shape estimation apparatus 102 can directly control the camera 111 using the camera parameters decided by the foreground information obtainment unit 131.

The outline shape estimation unit 132 executes processing of estimating the outline shape of the object based on the foreground image and the camera parameters, thereby generating an outline shape model of the object. The outline shape estimation unit 132 can be implemented as a function of executing image processing for the foreground image obtained by the foreground information obtainment unit 131 and deployed into the RAM 303 when, for example, the CPU 301 executes the computer program stored in the ROM 302 or the like. The outline shape model is shape information which is input to shape accuracy improvement processing, that is, which is to undergo the shape accuracy improvement processing, and is a model representing an approximate shape of the object. In this embodiment, assume that the shape model is formed by a set (to be referred to as a point group hereinafter) of point elements each having three-dimensional coordinates. The outline shape estimation unit 132 estimates the outline shape model of the object using, for example, shape-from-silhouette. The generated outline shape model is stored in, for example, the RAM 303 or the auxiliary storage device 304.

The surface shape generation unit 133 excludes points existing in the object from the point group forming the outline shape model, thereby generating, as a surface shape, a point group existing on the surface. The surface shape generation unit 133 can be implemented as a function of executing processing for the outline shape model generated by the outline shape estimation unit 132 and deployed into the RAM 303 when, for example, the CPU 301 executes the computer program stored in the ROM 302 or the like. That is, the surface shape generation unit 133 generates a surface shape by a point group obtained by keeping, of the point group forming the outline shape model, a point group of the surface that can be visually perceived when the object is observed from the outside while excluding the remaining point group. Whether each point included in the point group forming the outline shape model is an internal point can be determined depending on whether there exist other points near the point. That is, of the outline shape model, a point having other points nearby is kept as a point of the surface shape, and a point having no other points nearby (or point having only a few other points nearby) can be determined not to be a point of the surface shape and removed. The generated point group representing the surface shape is held in, for example, the RAM 303 or the auxiliary storage device 304.

Using the surface shape and the camera parameters, the distance image generation unit 134 generates a distance image indicating a distance from each camera to the surface shape. The distance image generation unit 134 can be implemented when, for example, the CPU 301 executes the computer program stored in the ROM 302 or the like. For example, the distance image generation unit 134 can be implemented as a function of executing, by using the camera parameters output from the foreground information obtainment unit 131, processing for data indicating the surface shape generated by the surface shape generation unit 133 and deployed into the RAM 303. In this embodiment, a shortest distance image indicating the shortest distance from the camera to the surface of the object and a longest distance image indicating the longest distance are generated. In one example, the shortest distance image can be a distance image up to a surface, which is visible by the camera, of the surface shape of the object, and the longest distance image can be a distance image up to a surface, which is invisible by the camera, of the surface shape of the object. Note that the shortest distance image and the longest distance image are generated for each of the plurality of cameras 111. The generated shortest distance images and the longest distance images are held in, for example, the RAM 303 or the auxiliary storage device 304.

Figure 4:
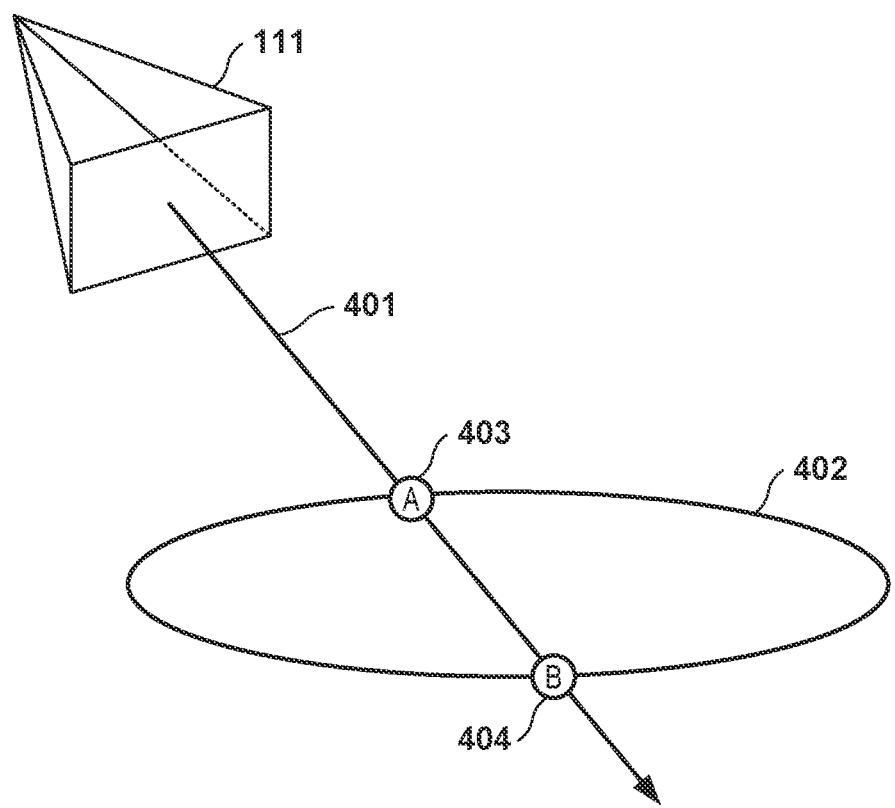
FIG. 4 is a view for explaining the visibility of an element of a shape model by a camera.

The visibility determination unit 135 determines visibility from each camera for each point of the outline shape model. The visibility determination unit 135 can be implemented when, for example, the CPU 301 executes the computer program stored in the ROM 302 or the like. Based on the shortest distance image and the longest distance image generated by the distance image generation unit 134, for example, the visibility determination unit 135 determines a point that can be observed by each camera 111 among the points included in the outline shape model generated by the outline shape estimation unit 132. Note that the distance image generation unit 134 may perform the determination processing based on, for example, the camera parameters obtained by the foreground information obtainment unit 131 and stored in the RAM 303 or the like. The visibility is information indicating whether each point of the shape model is visible from each camera. The visibility determination processing will be described with reference to a schematic view shown in FIG. 4. Referring to FIG. 4, assumed that the camera 111 faces in a direction 401. Assume that a surface 402 of the object includes a point A 403 and a point B 404 as part of the point group of the shape model. As shown in FIG. 4, if the point A 403 and the point B 404 are located on an extension of the direction 401, the visibility determination unit 135 determines that the point A 403 whose distance from the camera 111 is shorter is a point visible from the camera 111. On the other hand, the visibility determination unit 135 determines that the point B 404 whose distance from the camera 111 is longer than that of the point A 403 and which is hidden by the point A 403 is a point invisible from the camera 111. For example, the visibility determination unit 135 can store, as visibility information, information indicating a visible point group for each camera 111 in the RAM 303 or the auxiliary storage device 304.

The shape accuracy improvement unit 136 improves the accuracy of the outline shape model to generate a three-dimensional shape model of the object. The shape accuracy improvement unit 136 can be implemented when, for example, the CPU 301 executes the computer program stored in the ROM 302 or the like. For example, based on the difference between the longest distance image and the shortest distance image generated by the distance image generation unit 134 and the visibility information generated by the visibility determination unit 135, the shape accuracy improvement unit 136 specifies a camera to be used to improve the accuracy of the outline shape model. Then, the shape accuracy improvement unit 136 uses the specification result to improve the accuracy of the outline shape model estimated by the outline shape estimation unit 132. The outline shape model with improved accuracy can be stored in, for example, the RAM 303 or the auxiliary storage device 304. The outline shape model with improved accuracy is provided, as a final three-dimensional shape model of the object, to an external apparatus (for example, a server, a client apparatus, or the like for drawing a virtual viewpoint image) via the communication interface 307.

(Procedure of Processing)

Figure 5:
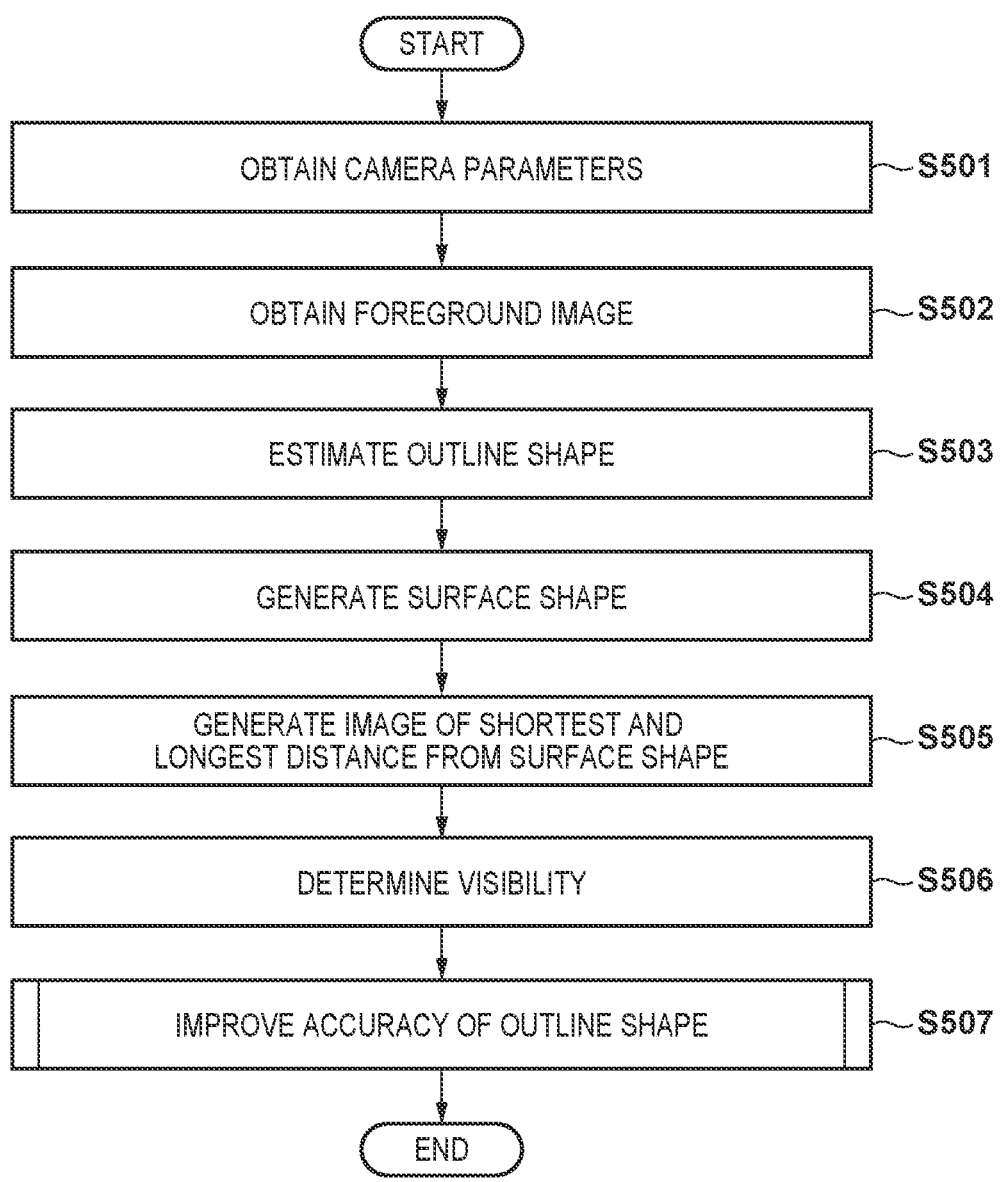
FIG. 5 is a flowchart illustrating an example of the procedure of shape estimation processing according to the first embodiment.

An example of the procedure of processing executed by the shape estimation apparatus 102 will be described with reference to FIG. 5. The following description assumes that each process is implemented when the CPU 301 executes the computer program stored in the ROM 302 or the RAM 303 but the present disclosure is not limited to this. For example, if a dedicated hardware component is used, the CPU 301 used as a term may be rephrased as the dedicated hardware component in the following description.

In step S501, the CPU 301 controls the communication interface 307 to communicate with the image capturing apparatus 101, thereby obtaining the camera parameters from the image capturing apparatus 101. In one example, the CPU 301 can generate a request signal to request the camera parameters to be provided, transmit the request signal to the image capturing apparatus 101 via the communication interface 307, and obtain the camera parameters as a response to the request signal. Note that the CPU 301 may, for example, communicate with the camera 111 via the communication interface 307 and obtain the state of the camera 111, thereby internally deciding the camera parameters and obtaining them. If the CPU 301 decides the camera parameters, the CPU 301 may provide the camera parameters to the camera 111 via the communication interface 307, thereby controlling the camera 111. Note that the camera parameters need not be obtained every time a captured image is obtained, and it suffices to obtain the camera parameters at least once before shape estimation. For example, the obtained camera parameters are stored in the RAM 303 or the auxiliary storage device 304 so as to be usable in subsequent processing.

In step S502, the CPU 301 obtains a foreground image extracted from an image captured by the camera 111 of the image capturing apparatus 101. For example, the CPU 301 can obtain the foreground image by obtaining the captured image from the image capturing apparatus 101 via the communication interface 307, deploying it into the RAM 303, and executing general foreground extraction processing for the captured image. The CPU 301 generates a silhouette image of the object. For example, by setting 0 as pixel values in a region where there is no object and setting values other than 0 as pixel values in an object region, a silhouette image can be generated. A silhouette image can be generated by a general method such as a background difference method of calculating the difference between a background image (for example, an image of a stadium before the start of a sports game) captured in advance when there is no object and a captured image obtained by capturing an object. Note that the method of generating a silhouette image is not limited to this. For example, a silhouette image may be generated by using a method of extracting a region of an object (human body) using, for example, a method of recognizing the object. If the image capturing apparatus 101 executes the foreground extraction processing, the CPU 301 obtains the foreground image from the image capturing apparatus 101 via the communication interface 307. Note that in this case, the image capturing apparatus 101 can execute the foreground extraction processing, as described above. If the CPU 301 obtains the foreground image from the image capturing apparatus 101, it can generate a silhouette image by deleting texture information from the foreground image. Note that if the CPU 301 generates a silhouette image, it can further generate texture information of the foreground image. The image capturing apparatus 101 may generate a silhouette image. In this case, the CPU 301 can obtain the silhouette image via the communication interface 307. Note that in this case, the CPU 301 can further obtain the texture information of the foreground image via the communication interface 307. Note that the silhouette image is used to estimate an outline shape in step S503 (to be described later), and the texture information is used to improve the accuracy of the outline shape in step S507. Therefore, the silhouette image and the texture information can temporarily be stored in the RAM 303 or the auxiliary storage device 304.

In step S503, the CPU 301 estimates the outline shape of the object using the silhouette image obtained in step S502 and the camera parameters obtained in step S501, thereby generating a outline shape model. The outline shape model is generated using an existing method such as shape-from-silhouette. With this processing, the CPU 301 obtains point group information representing the shape of the object. The coordinate $[Pw]=(x, y, z)$ of each point is represented by, for example, the same coordinate system (world coordinate system) as the coordinate system of the extrinsic parameters of the camera. Note that throughout this embodiment, square brackets [ ] indicate a coordinate, a vector, or a matrix including a plurality of elements. Furthermore, the CPU 301 can divide the obtained point group into pieces of point group information for respective objects by processing the point group by a general three-dimensional labeling method based on the presence/absence of adjacent points. Each point is assigned with an object ID as a labeling result. After that, for example, the CPU 301 can designate the object ID to obtain the point group information of the corresponding object. As the shape estimation method, another general method may be used. The point group information for each object is temporarily stored in, for example, the RAM 303 or the auxiliary storage device 304 to be used later.

In step S504, the CPU 301 generates a surface point group by deleting, from the point group of the outline shape model, a point group existing inside. The generated surface point group is stored in, for example, the RAM 303 or the auxiliary storage device 304 to be used later. A method of determining whether each point included in the point group is a point existing inside or a point existing on the surface will now be described. With reference to the connection relationship among the respective points, it can be determined whether each point is an internal point. Note that it is assumed that the point group is regularly aligned and can uniquely be designated by the coordinates (integers) of the three axes (x, y, z) orthogonal to each other. Based on this, if one point included in the outline shape model is set as a determination target, the CPU 301 confirms whether there exist six other neighboring points (for example, in the x±1, y±1, and z±1 directions). If there exist six other neighboring points in all the directions, the CPU 301 determines that the target point is an internal point; otherwise, the CPU 301 determines that the target point is a surface point. By repetitively executing this processing for all the points, the CPU 301 can generate a set of points forming the surface of the object. The generated surface point group is temporarily stored in the RAM 303 or the auxiliary storage device 304.

In step S505, the CPU 301 obtains the camera parameters of the camera 111 and the surface point group information held in, for example, the RAM 303, and generates distance images from each camera to the object. As the distance images, a shortest distance image indicating the shortest distance from the camera to the object surface and a longest distance image indicating the longest distance from the camera to the object surface are generated for each camera. The shortest distance image and the longest distance image are temporarily stored in, for example, the RAM 303 or the auxiliary storage device 304. A method of generating a distance image indicating the distance from the camera to the object surface will now be described. The distance image has the same width and height as those of the captured image, and each pixel stores a distance value. First, the world coordinate [Pw] of a point of the surface point group is multiplied by an extrinsic matrix [Te] to be converted into a coordinate [Pc] in the camera coordinate system. [Te] is a conversion matrix formed from the extrinsic parameters of the camera. If a direction in which the lens of the camera faces corresponds to a positive range of the z-axis of the camera coordinate system by setting the camera position as the origin, the z-coordinate of [Pc] indicates the distance when the point is viewed from the camera. Next, an image coordinate [Pi] of [Pc] is calculated to obtain the coordinates of the distance image storing the distance. [Pi] is calculated by multiplying, by an intrinsic matrix [Ti], a normalized camera coordinate obtained by normalizing [Pc] by the z-coordinate. [Ti] represents a matrix formed based on the intrinsic parameters of the camera. If a pixel at [Pi] to be calculated stores the already calculated distance value of another point (that is, a distance value calculated with respect to another point of the surface point group projected on the same image coordinate), the newly calculated value of the z-coordinate of the coordinate is compared with the already stored value. To generate a shortest distance image, if the newly calculated value of the z-coordinate of the coordinate is smaller than the already stored value, the newly calculated value of the z-coordinate of the coordinate is stored as a pixel value at [Pi]. To generate a longest distance image, if the newly calculated value of the z-coordinate of the coordinate is larger than the already stored value, the newly calculated value of the z-coordinate of the coordinate is stored as a pixel value at [Pi]. By executing these processes for all the points of the surface point group, the CPU 301 can generate a shortest distance image and a longest distance image for one camera. By executing this processing for all the cameras, the CPU 301 can generate shortest distance images and longest distance images for all the cameras.

In step S506, the CPU 301 obtains the camera parameters held in, for example, the RAM 303, the point group indicating the outline shape of the object, and the shortest distance images. Furthermore, the CPU 301 obtains depth threshold information held in advance in, for example, the RAM 303 or the auxiliary storage device 304 and to be used to determine visibility. Note that depth threshold information may be designated by, for example, a user operation accepted via the operation unit 306. The CPU 301 determines the visibility of the point group based on the obtained information, and temporarily stores visibility information as a result of the determination processing in, for example, the RAM 303 or the auxiliary storage device 304. A method of determining visibility information will now be described. First, the CPU 301 converts the world coordinate [Pw] of an arbitrary point of the point group indicating the outline shape into a coordinate in the camera coordinate system and the image coordinate system, thereby calculating the camera coordinate [Pc] and the image coordinate [Pi]. Then, the CPU 301 compares the pixel value of the distance image at [Pi] with the z-coordinate (the distance from the camera to the point) of [Pc], and compares a difference d with the depth threshold. If the difference d is smaller than the depth threshold, the CPU 301 determines that the point is visible from the camera. On the other hand, if the difference d is equal to or larger than the depth threshold, the CPU 301 determines that the point is invisible from the camera. The CPU 301 executes the above processing for all the points included in the point group and all the cameras. Thus, it is determined whether each point of the point group indicating the outline shape is visible from each of the plurality of cameras, and visibility information for specifying whether an arbitrary point included in the point group indicating the outline shape is visible from an arbitrary camera is generated.

In step S507, the CPU 301 obtains the camera parameters, the point group indicating the outline shape of the object, the shortest distance images, the longest distance images, and the visibility information held in, for example, the RAM 303. After that, based on these pieces of information, the CPU 301 improves the accuracy of the outline shape of the object, thereby generating a three-dimensional shape model of the object. Note that improvement of the accuracy of the outline shape of the object will be described later with reference to FIG. 6. The CPU 301 stores the generated three-dimensional shape model of the object in, for example, the RAM 303 or the auxiliary storage device 304. Furthermore, the CPU 301 can provide the generated three-dimensional shape model of the object to an external apparatus via, for example, the communication interface 307.

Figure 6:
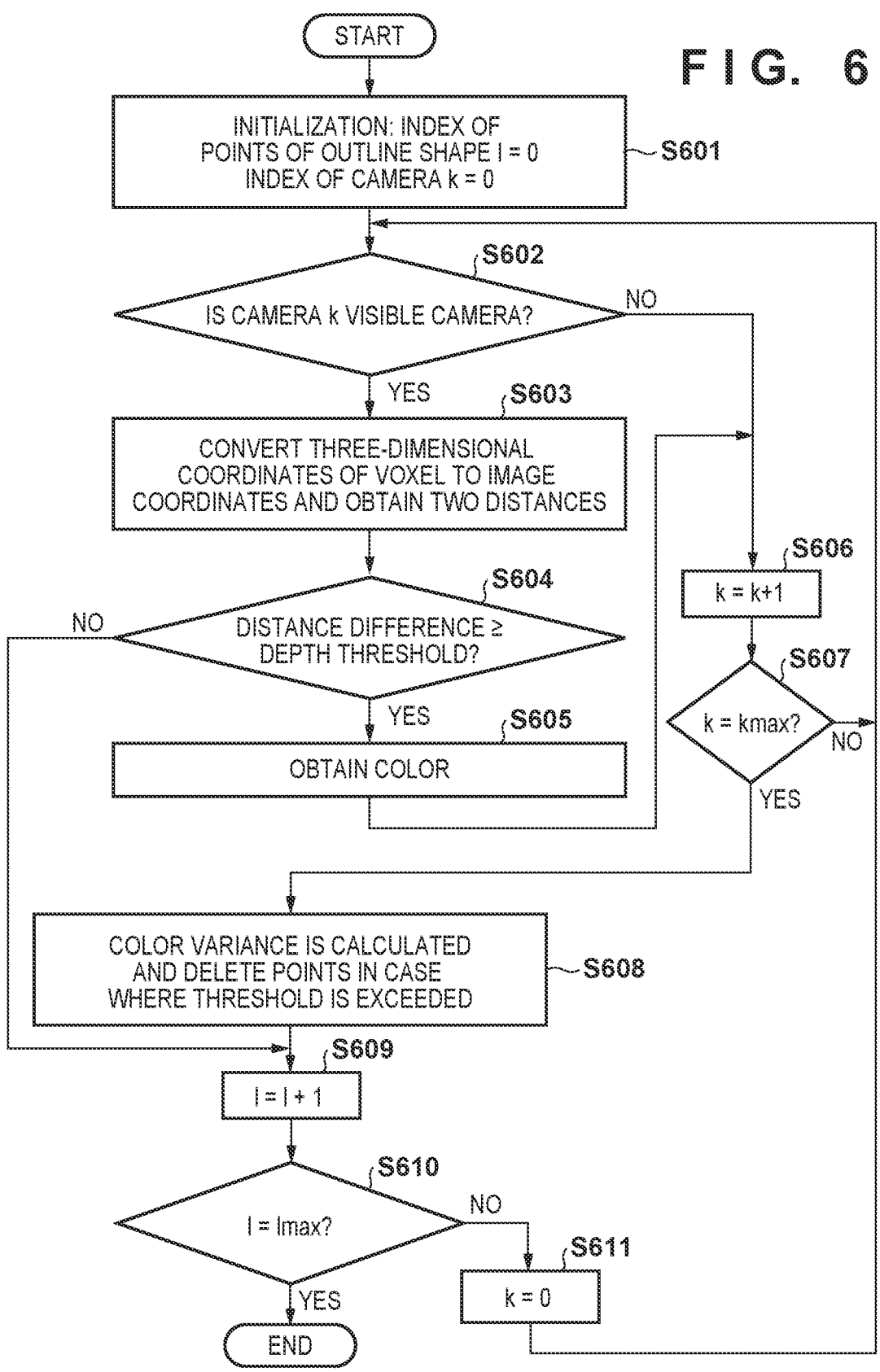
FIG. 6 is a flowchart illustrating an example of the procedure of shape accuracy improvement processing according to the first embodiment.

Subsequently, the procedure of improving the accuracy of the outline shape of the object will be described with reference to FIG. 6.

In step S601, the CPU 301 executes initialization processing. The initialization processing is processing for executing processes for all the points of the outline shape and all the plurality of cameras 111 in the following processing. In this embodiment, an index l of each point included in the point group of the outline shape is set to 0 and a camera index k is set to 0. Assume here that lmax points included in the point group of the outline shape are assigned in advance with indices of 0 to lmax−1, and one point is uniquely designated by the index. Similarly, assume that kmax cameras 111 are assigned with indices of 0 to kmax−1, and one camera is uniquely designated by the index. Note that this is done so that the processing is performed for all the points as processing targets included in the point group of the outline shape and all the cameras as processing targets included in the plurality of cameras 111, and the indices need not be used. For example, arbitrary identification information which allows each camera or each point included in the point group of the outline shape to be specified may be used. If the outline shape or the camera parameters are stored in a continuous area of the RAM 303, the processing for all the points and all the cameras may be performed by sequentially reading out the information from the start address of the area that stores the information.

In step S602, with reference to the visibility information generated in step S506 and stored in, for example, the RAM 303 or the like, the CPU 301 determines whether the point with the index 1 is visible from the camera with the index k. If it is determined that the point with the index 1 is visible from the camera with the index k, the CPU 301 converts, in step S603, the world coordinate [Pw] of the point with the index 1 into the camera image coordinate [Pi] using the extrinsic parameters and intrinsic parameters of the camera with the index k. Then, the CPU 301 refers to and obtains the pixel value of the image coordinate [Pi] in each of the shortest distance image and the longest distance image with respect to the camera with the index k.

In step S604, the CPU 301 calculates a distance difference by subtracting the pixel value in the shortest distance image from the pixel value in the longest distance image obtained in step S603, and compares the distance difference with a distance difference threshold obtained in advance. If it is determined that the distance difference is smaller than the threshold, the CPU 301 does not determine to delete the point. That is, if the object includes a long and narrow portion or a thin portion, the portion when viewed from at least one camera includes one point referred to when forming the shortest distance image and another point referred to when forming the longest distance image, and the distance difference between these points is small. Therefore, since the point with the index 1 having such characteristic is considered to correspond to a portion having a thin or flat shape of the object, this point is excluded from the deletion target. In this case, the processing for the point with the index 1 ends at this stage, and the CPU 301 executes processing in step S609 (to be described later). A case in which the CPU 301 determines in step S602 that the point with the index 1 is invisible from the camera with the index k will be described later.

If it is determined in step S604 that the distance difference is equal to or larger than the threshold, the CPU 301 obtains, in step S605, color information at the camera image coordinate [Pi] with reference to the pixel of the foreground image of the camera. Note that the CPU 301 may reduce the influence of noise by using not only the color information of the pixel of the foreground image but also color information of pixels on the periphery of the pixel. In this case, based on the physical size (or an interval from an adjacent point) of the point being processed, a projection size (pixel count) in a case in which the point is projected onto the camera image can be calculated. Furthermore, the CPU 301 may obtain pixel values in a projection region within a range having, as a radius, half of the physical size of the point being processed and having the camera image coordinate [Pi] as the center, and sets the average value or median of the pixel values as a pixel value in a case in which the point being processed is projected onto the camera.

After that, in step S606, the CPU 301 increments the camera index. That is, +1 is added to the index k. In addition, if it is determined in step S602 that the point with the index 1 is invisible from the camera with the index k, the CPU 301 increments the camera index in step S606. In step S607, the CPU 301 determines whether there exists a camera with the incremented index. Note that FIG. 6 shows a case in which if the index reaches kmax which is not assigned to any camera, it is determined that there is no camera with the incremented index. If it is determined in step S607 that there exists a camera with the incremented index, the CPU 301 repeats the processes in steps S602 to S607 for the camera with the incremented index and the point with the index 1.

By repetitively executing the processes in steps S602 to S607, the CPU 301 can collect color information corresponding to the point with the index 1 in one or more images captured by one or more cameras each of which can capture the point without any obstacle. Then, in step S608, the CPU 301 calculates the variance of the color (pixel values) using the thus collected color information, and if the variance exceeds a predetermined threshold, the CPU 301 deletes the point with the index 1 from the point group of the outline shape. If, for example, the color is represented by RGB components, the CPU 301 can calculate variance for each component of the color. Note that the CPU 301 may calculate variance in another color space by changing a color representation method. If, for example, the color variance exceeds the predetermined threshold with respect to one or more color components, the CPU 301 can delete the point with the index 1 from the point group of the outline shape. Note that if the average value of the variance values with respect to the plurality of color components exceeds the predetermined threshold, the CPU 301 may delete the point with the index 1 from the point group of the outline shape. Note that to perform the determination processing in step S608, the CPU 301 can obtain information of the threshold of color variance for deletion determination, which is held in advance in, for example, the RAM 303 or the auxiliary storage device 304. Note that the predetermined threshold information may be designated by, for example, a user operation accepted via the operation unit 306.

On the other hand, while repetitively executing the processes in steps S602 to S607, the CPU 301 does not perform the processing in step S608 if the point with the index 1 corresponds to the long and narrow portion or the thin portion of the object with respect to the distance images of any of the cameras. That is, the CPU 301 excludes such point from the deletion target from the point group of the outline shape. Therefore, it is possible to prevent, for example, a situation in which a point corresponding to a different surface of the long and narrow portion or the thin portion of the object is processed as the same point, and is erroneously deleted by the subsequent processing in step S608. This can suppress an error in the finally output three-dimensional shape model of the object.

Thus, the processing for the point with the index 1 is completed. Subsequently, in step S609, the CPU 301 increments the index 1. That is, +1 is added to the index 1. In step S610, the CPU 301 determines whether there exists a point with the incremented index. If it is determined in step S610 that there exists a point with the incremented index, the CPU 301 initializes the camera index k in step S611. Then, the CPU 301 repeats the processing from step S602 with respect to the point with the incremented index. On the other hand, if the CPU 301 determines in step S610 that there is no such point, the processing is completed for all the points included in the point group of the outline shape, and thus the processing ends. Note that FIG. 6 shows a case in which if the index reaches lmax which is not assigned to any point, it is determined that there is no point with the incremented index.

Second Embodiment

Figure 7:
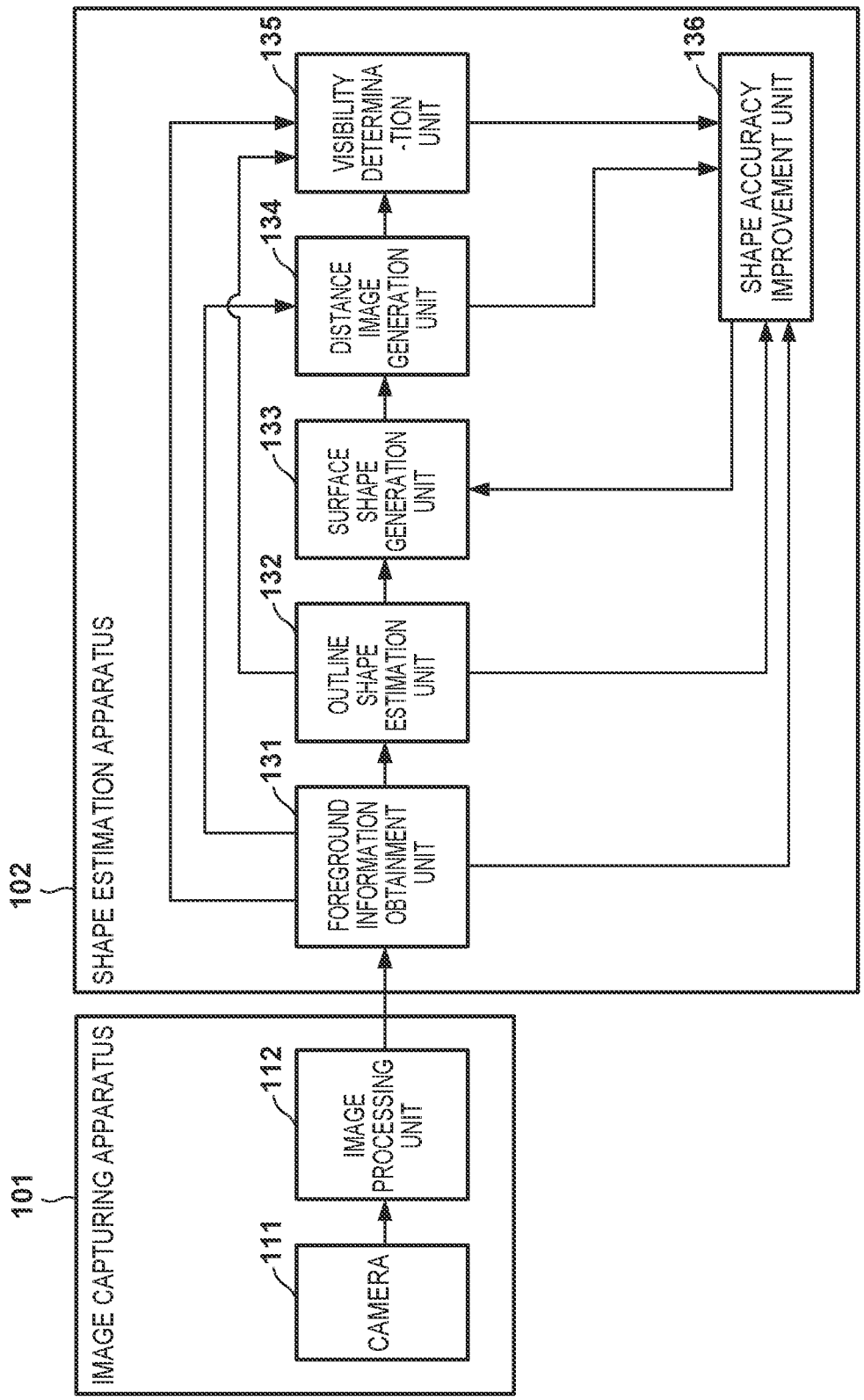
FIG. 7 is a block diagram showing an example of a system configuration according to the second embodiment.

The first embodiment has explained an example in a case in which accuracy improvement processing is executed for the outline shape only once to output the final three-dimensional shape model of the object. This embodiment will describe an example in a case in which the above-described accuracy improvement processing is repetitively applied by setting, as a point group of an outline shape, a three-dimensional shape model obtained as a result of the accuracy improvement processing. Note that a system according to this embodiment has almost the same configuration as that in the first embodiment, as shown in FIG. 7, but the configuration is different in that a three-dimensional shape model output from a shape accuracy improvement unit 136 is fed back to a surface shape generation unit 133 as a point group of an outline shape.

In this embodiment, processing executed by a shape estimation apparatus 102 will be described with reference to FIG. 8. This processing is obtained by adding processing of step S801 between steps S505 and S506 and returning the process to step S504 after processing in step S507 in the processing described with reference to FIG. 5 in the first embodiment.

After executing the accuracy improvement processing of the outline shape in step S507, a CPU 301 repeats processes in step S504 and subsequent steps by setting, as a point group of the outline shape, a point group obtained after the accuracy improvement processing. If it is determined in step S801 to continue the processing, the CPU 301 further executes the accuracy improvement processing. On the other hand, if it is determined in step S801 not to continue the processing, the CPU 301 can output the result of the accuracy improvement processing in immediately preceding step S507 as the final three-dimensional shape model of the object.

A method of determining in step S801 whether to continue the processing will now be described. For example, the CPU 301 executes the determination processing using repetition count information or a change amount of the distance image.

If the repetition count information is used, information of a predetermined number of times the processing is repetitively executed is input in advance to the system via, for example, a setting file, and held in a RAM 303 or an auxiliary storage device 304. In this case, with reference to the RAM 303 or the auxiliary storage device 304, the CPU 301 can obtain the information of the predetermined number of times. The information of the predetermined number of times may be designated by, for example, a user operation accepted via an operation unit 306. The CPU 301 can determine in step S801 whether the number of times of the accuracy improvement processing executed in step S507 reaches the predetermined number of times. In this case, if the number of times of the accuracy improvement processing in step S507 reaches the preset predetermined number of times, the CPU 301 determines in step S801 not to execute the processing anymore, and can end the processing. On the other hand, if the number of times of the accuracy improvement processing in step S507 does not reach the preset predetermined number of times, the CPU 301 determines in step S801 to continue the processing, and executes processing in step S506. Note that if it is determined, based on the number of times of the accuracy improvement processing, whether to continue the processing, the CPU 301 may perform the determination processing immediately after the end of processing in step S507. That is, the CPU 301 need not repeat the processes in steps S504 and S505 in a situation in which the accuracy improvement processing is not performed anymore.

On the other hand, if the change amount of the distance image is used, the CPU 301 calculates, for each pixel value of each camera, the distance difference between the shortest distance image of the accuracy improvement processing executed two times before and the shortest distance image of the accuracy improvement processing executed immediately before. Then, if the number of pixels whose distance difference is equal to or larger than a preset threshold is smaller than a predetermined number with respect to all the cameras, the CPU 301 can determine that it is unnecessary to execute the accuracy improvement processing anymore, and determine, in step S801, not to continue the processing. If the number of pixels whose distance difference is equal to or larger than the threshold is equal to or larger than the predetermined number with respect to one or more cameras, the CPU 301 can determine that it is necessary to further execute the accuracy improvement processing, and determine, in step S801, to continue the processing. Note that for example, if the total sum of the change amounts with respect to the respective cameras and the respective pixels is smaller than a predetermined value, it may be determined that it is unnecessary to repetitively perform the processing anymore. As described above, it may be determined based on various criteria of the change amount whether it is necessary to repetitively perform the processing. Note that if the change amount of the distance image is used, it is necessary to calculate the latest distance image, and thus the CPU 301 can execute the processing in step S801 after executing the processes in steps S504 and S505. Note that the above-described predetermined number is input in advance to the system via, for example, a setting file, and held in the RAM 303 or the auxiliary storage device 304. In this case, with reference to the RAM 303 or the auxiliary storage device 304, the CPU 301 can obtain the information of the predetermined number. The information of the predetermined number may be designated by, for example, a user operation accepted via the operation unit 306. Note that if the magnitude of the change amount of the distance image does not converge, the CPU 301 may determine, based on the repetition count, to end the repetitive processing.

Note that when executing the repetitive processing, the CPU 301 may change the distance difference threshold to be used in step S604 every time the repetitive processing is performed. In this case, the distance difference thresholds the number of which is equal to the maximum number of times the accuracy improvement processing is assumed to be executed repetitively are input in advance to the system via, for example, a setting file, and held in the RAM 303 or the auxiliary storage device 304. With reference to the RAM 303 or the auxiliary storage device 304, the CPU 301 sets the distance difference threshold to be used in the repetitive processing every time the repetitive processing is performed. The distance difference threshold can be designated by, for example, a user operation accepted via the operation unit 306. The distance difference threshold can be set to a relatively large value in the first accuracy improvement processing, and can be set smaller as the processing is repeated. This can delete many points in the first accuracy improvement processing in which a large shape error such as a concave portion remains, and can precisely perform point deletion determination processing every time the accuracy improvement processing is repetitively performed.

As described above, by repetitively executing the accuracy improvement processing, it is possible to generate a three-dimensional shape model representing the object more faithfully.

Note that in the above-described processes, the pieces of information are temporarily stored in the RAM 303 or the auxiliary storage device 304 but some or all of the pieces of information may be held in, for example, a cache of the CPU 301 until the accuracy improvement processing of the outline shape model ends. With respect to the above-described processes, for example, a plurality of CPUs 301 may simultaneously execute processing concerning the plurality of points included in the point group of the outline shape and processing concerning the plurality of cameras. The above embodiment has explained the example in which the shape of the object is indicated by the point group but the same processing can be executed in a case in which the shape of the object is represented by other elements. That is, with respect to a first element group representing the object by arbitrary elements, distance images from the camera to the surface of the object represented by the first element group can be obtained and a second element group can be generated by deleting unnecessary elements based on the distance images. The elements can include, for example, surfaces, vertices, and sides of a mesh structure.

In the above-described processing, the example in which the shortest distance image and the longest distance image are generated has been explained. The present disclosure, however, is not limited to this. For example, in step S603, the CPU 301 may calculate the distance between, among intersection points of the surface of the outline shape and a straight line connecting the position of the camera with the index k and the point (first point) with the index 1, a second point different from the first point and the first point. Note that in this case, since the first point is a point visible from the camera, the distance between the point and the position of the camera corresponds to the shortest distance. On the other hand, it is assumed that if, for example, the accuracy improvement processing is repeated to form a concave portion, there exist a plurality of second points different from the first point among the intersection points of the surface of the outline shape and the straight line connecting the position of the camera and the first point. In this case, for example, a point closest to the first point may be selected as the second point. Note that if elements representing the shape of the object are not points, the CPU 301 can extend a straight line connecting the position of the camera and an edge within a range indicated by a first element, thereby specifying the range of a second element corresponding to a position that intersects the surface of the shape of the object. Then, based on the distance difference between the ranges of the first element and the second element, the CPU 301 may perform element deletion determination processing. Whether to repeat the above processing can be determined based on shortest distance information. Note that the above-described processing of determining, based on the shortest distance image, whether to repetitively execute the processing may be performed based on another distance as a criterion. For example, it may be determined, based on the distance from the camera to a second nearest surface, whether it is necessary to perform the repetitive processing. Alternatively, another convergence determination criterion may be used. For example, if the magnitude of the change amount of the element group is smaller than a predetermined value, the repetitive processing ends.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-039560, filed Mar. 14, 2022, which is hereby incorporated by reference herein in its entirety.

What is claimed is:

1. A shape estimation apparatus, comprising:
one or more processors; and
one or more memories that store computer-readable instructions for causing, when executed by the one or more processors, the one or more processors to function as:
an estimation unit configured to estimate, based on captured images obtained by capturing an object from different directions using a plurality of image capturing apparatuses, a first element group representing a three-dimensional shape of the object;
a determination unit configured to determine, for each of elements included in the first element group, based on color in the captured images corresponding to the element, whether to delete the element from the first element group; and
a generation unit configured to generate a second element group by deleting, from the first element group, the element determined to be deleted,
wherein with respect to a first element among elements forming a surface of the shape represented by the first element group, in a case where a distance between the first element and a second element different from the first element and corresponding to a position at which a straight line connecting the first element and the image capturing apparatus that has captured the first element intersects the surface does not exceed a predetermined threshold, the determination unit determines to exclude the first element from a deletion target from the first element group regardless of the color.

2. The apparatus according to claim 1, wherein the computer-readable instructions further cause, when executed by the one or more processors, the one or more processors to function as a unit configured to generate a third element group by deleting, from the first element group, an element not corresponding to the surface of the shape represented by the first element group.

3. The apparatus according to claim 1, wherein in a case where the straight line connecting the first element and the image capturing apparatus that has captured the first element intersects the surface at a plurality of positions, the determination unit determines whether a distance between the first element and the second element corresponding to a position closest to the first element among the plurality of positions exceeds the predetermined threshold.

4. The apparatus according to claim 1, wherein the computer-readable instructions further cause, when executed by the one or more processors, the one or more processors to function as an obtainment unit configured to obtain a shortest distance image indicating a distance from the image capturing apparatus that has captured the first element to a closest position on the surface of the shape represented by the first element group, and a longest distance image indicating a distance from the image capturing apparatus to a farthest position, wherein the determination unit specifies the distance between the first element and the second element using the shortest distance image and the longest distance image.

5. The apparatus according to claim 1, wherein the generation unit feeds back the second element group to the determination unit so as to execute repetitive processing using the second element group as the first element group.

6. The apparatus according to claim 5, wherein the repetitive processing is performed until a repetition count reaches a predetermined number of times.

7. The apparatus according to claim 5, wherein the repetitive processing is performed until change amounts of the distances from the plurality of image capturing apparatuses to a surface of a shape represented by the second element group satisfy a predetermined criterion.

8. The apparatus according to claim 5, wherein a different predetermined threshold is set every time the repetitive processing is performed.

9. The apparatus according to claim 1, wherein by using, as color corresponding to each of the elements included in the first element group, color in a range in a case in which the element is projected onto the captured image, the determination unit determines whether to delete the element from the first element group.

10. The apparatus according to claim 1, wherein the first element group and the second element group are point groups.

11. A processing method executed by a shape estimation apparatus, comprising:

estimating, based on captured images obtained by capturing an object from different directions using a plurality of image capturing apparatuses, a first element group representing a three-dimensional shape of the object;

determining, for each of elements included in the first element group, based on color in the captured images corresponding to the element, whether to delete the element from the first element group; and generating a second element group by deleting, from the first element group, the element determined to be deleted, wherein with respect to a first element among elements forming a surface of the shape represented by the first element group, in a case where a distance between the first element and a second element different from the first element and corresponding to a position at which a straight line connecting the first element and the image capturing apparatus that has captured the first element intersects the surface does not exceed a predetermined threshold, it is determined, in the determining, to exclude the first element from a deletion target from the first element group regardless of the color.

12. A non-transitory computer-readable storage medium that stores a program for causing a computer included in a shape estimation apparatus to:

estimate, based on captured images obtained by capturing an object from different directions using a plurality of image capturing apparatuses, a first element group representing a three-dimensional shape of the object;

perform, for each of elements included in the first element group, based on color in the captured images corresponding to the element, determination of whether to delete the element from the first element group; and generate a second element group by deleting, from the first element group, the element determined to be deleted, wherein with respect to a first element among elements forming a surface of the shape represented by the first element group, in a case where a distance between the first element and a second element different from the first element and corresponding to a position at which a straight line connecting the first element and the image capturing apparatus that has captured the first element intersects the surface does not exceed a predetermined threshold, it is determined, in the determination, to exclude the first element from a deletion target from the first element group regardless of the color.

* * * * *